US012284728B2

(12) United States Patent
Johnson et al.

(10) Patent No.: US 12,284,728 B2
(45) Date of Patent: Apr. 22, 2025

(54) INTEGRATED POWER SUPPLY AND CONTROL SYSTEM AND METHOD

(71) Applicant: PTI IP LLC, Solon, OH (US)

(72) Inventors: Benjamin D. Johnson, Northfield, OH (US); David W. Cochran, Orange, OH (US); Jonathan M. Katz, Solon, OH (US); Don W. Cochran, Gates Mills, OH (US)

(73) Assignee: PTI IP LLC, Cleveland, OH (US)

( * ) Notice: Subject to any disclaimer, the term of this patent is extended or adjusted under 35 U.S.C. 154(b) by 524 days.

(21) Appl. No.: 15/254,731

(22) Filed: Sep. 1, 2016

(65) Prior Publication Data

US 2017/0059172 A1 Mar. 2, 2017

Related U.S. Application Data

(60) Provisional application No. 62/212,941, filed on Sep. 1, 2015.

(51) Int. Cl.
*H05B 1/02* (2006.01)
*H05B 3/00* (2006.01)

(52) U.S. Cl.
CPC ......... *H05B 1/0263* (2013.01); *H05B 3/0076* (2013.01)

(58) Field of Classification Search
None
See application file for complete search history.

(56) References Cited

U.S. PATENT DOCUMENTS

| | | | |
|---|---|---|---|
| 4,528,457 A | 7/1985 | Keefe et al. | |
| 5,250,775 A | 10/1993 | Maehara et al. | |
| 5,305,297 A | 4/1994 | Nishiuchi et al. | |
| 5,321,232 A * | 6/1994 | Ogle | F24C 7/087 219/494 |
| 5,748,657 A | 5/1998 | Gaddis | |
| 5,764,040 A | 6/1998 | Miller | |
| 6,037,571 A | 3/2000 | Christopher | |
| 6,355,915 B1 * | 3/2002 | Ziaimehr | G05D 23/1913 219/412 |
| 6,529,686 B2 * | 3/2003 | Ramanan | H01L 21/67103 118/724 |
| 6,852,959 B1 | 2/2005 | Han et al. | |
| 6,891,478 B2 | 5/2005 | Gardner | |

(Continued)

FOREIGN PATENT DOCUMENTS

| | | | |
|---|---|---|---|
| AU | 200238260 A1 | 6/2002 | |
| JP | 2002147762 A * | 5/2002 | A23L 5/15 |
| JP | 2009-41854 A | 2/2009 | |

OTHER PUBLICATIONS

International Search Report for PCT/US16/49956 dated Nov. 21, 2016.

(Continued)

*Primary Examiner* — Geoffrey S Evans
(74) *Attorney, Agent, or Firm* — Lippes Mathias LLP

(57) ABSTRACT

An integrated electrical power supply and control system and method are provided. Such a system and method utilize energy storage, memory and a processor to provide controlled direct current (DC) energy suitable for operating narrowband semiconductor irradiation arrays according to appropriate pulse width modulation patterns to achieve cooking/heating of comestibles.

42 Claims, 2 Drawing Sheets

(56) References Cited

U.S. PATENT DOCUMENTS

| | | | | |
|---|---|---|---|---|
| 7,034,267 | B2 | 4/2006 | Kim et al. | |
| 7,629,780 | B2 | 12/2009 | Ogawa | |
| 7,840,153 | B2 | 11/2010 | Semma et al. | |
| 7,886,734 | B2 | 2/2011 | Jin | |
| 8,126,319 | B2 | 2/2012 | De Luca | |
| 8,145,548 | B2 | 3/2012 | De Luca | |
| 8,258,640 | B2 | 9/2012 | Conway et al. | |
| 8,405,010 | B2 | 3/2013 | Van Dyke et al. | |
| 8,436,279 | B2 | 5/2013 | Cadima et al. | |
| 8,498,526 | B2 | 7/2013 | De Luca | |
| 8,731,385 | B2 | 5/2014 | De Luca | |
| 8,954,351 | B2 | 2/2015 | De Luca | |
| 2006/0118983 | A1 * | 6/2006 | Cochran | B29B 13/023 264/40.6 |
| 2006/0157470 | A1 * | 7/2006 | Cavada | F24C 7/082 219/411 |
| 2006/0202848 | A1 | 9/2006 | Volodarsky | |
| 2007/0007279 | A1 * | 1/2007 | Chun | H05B 6/6441 219/506 |
| 2007/0029306 | A1 * | 2/2007 | Chun | F24C 7/08 219/506 |
| 2007/0096352 | A1 * | 5/2007 | Cochran | B29B 13/023 264/40.6 |
| 2008/0037965 | A1 * | 2/2008 | De Luca | H05B 3/0076 392/416 |
| 2010/0015313 | A1 * | 1/2010 | Harris | F24C 7/08 426/523 |
| 2010/0072935 | A1 | 3/2010 | Aas et al. | |
| 2010/0320189 | A1 * | 12/2010 | Buchheit | H05B 6/6441 219/488 |
| 2011/0002677 | A1 * | 1/2011 | Cochran | H05B 3/0057 392/416 |
| 2011/0067726 | A1 * | 3/2011 | Cochran | B64D 15/00 134/1 |
| 2012/0063753 | A1 * | 3/2012 | Cochran | A47J 36/02 392/416 |
| 2012/0163780 | A1 | 6/2012 | De Luca | |
| 2012/0181864 | A1 | 7/2012 | Honma et al. | |
| 2013/0092682 | A1 | 4/2013 | Mills et al. | |
| 2013/0213951 | A1 * | 8/2013 | Boedicker | H05B 1/0263 219/413 |
| 2014/0170275 | A1 | 6/2014 | Bordin | |
| 2014/0214136 | A1 | 7/2014 | Liu et al. | |
| 2017/0215233 | A1 * | 7/2017 | Katz | F24C 7/046 |
| 2018/0142925 | A1 * | 5/2018 | De Luca | H02J 3/32 |

OTHER PUBLICATIONS

Supplementary European Search Report for EP 16 84 3001 dated Mar. 22, 2019.

* cited by examiner

INTEGRATED POWER SUPPLY AND CONTROL SYSTEM AND METHOD

This application is based on and claims priority to U.S. Provisional Application No. 62/212,941, filed Sep. 1, 2015, which is incorporated herein by reference in its entirety.

TECHNICAL FIELD

When designing a countertop appliance, various compromises are inherent. Size and footprint are design limitations, cost is a design limitation, and available power is another design limitation. These design decisions are advantageously made in full light of consumer preferences, performance requirements, product features, energy efficiency, and many other things. The presently described embodiments relate to providing and facilitating a unique integrated electrical power supply and control configuration.

BACKGROUND

By way of background, most household kitchens only have 120-volt electrical receptacle outlets proximate to the countertop. Older homes, apartments, and condominiums typically built before the 1970's may only have 15-amp circuits available unless they have been updated more recently. The kitchens in dwellings which have been built since about 1975 will typically have 20-amp, 120-volt outlets available on the countertop. Therefore, since "watts" is calculated as the product of volts times amps, only about 1,800 watts of 120-volt AC power is universally available in US homes. While more recent homes may have 2,400 watts available at the outlets, if the product designer wants to have the broadest possible customer base appeal, the designer cannot count on 2,400 watts being available to all customers. While 2,400-watt products may be acceptable to many customers, it could inherently limit the ultimate size of the market that is being addressed by a given product. While this number and the exact current available varies for homes around the world, all plugs available to a kitchen or other countertop device typically have substantially lower current available than dedicated power circuits which are intended for the larger built-in appliances. Many of the larger appliances are hard-wired into the higher powered circuits. Often, a safety factor dictates some further reduction in the useable power from the indicated current capacity on a fuse or circuit breaker.

Many kitchens have other very large appliances such as ranges, built-in or wall ovens, and cooktops which are supplied electricity on higher voltage, much larger current capacity circuits ranging from 30 amps to 70 amps (7,200 to 16,800 watts). A very high percentage of kitchens have heavier circuits of 240-volt electricity available but often only for the built-in appliances and not available to countertop outlets or plugs. The prospect of adding a 240-volt outlet, even if the cost is not high, may be quite daunting to a consumer who is considering a modestly priced countertop product.

It is therefore easy to conclude that for a whole class of countertop products, they must be designed to function within the 1,800-watt power range that is available to virtually every household consumer.

BRIEF DESCRIPTION

In one aspect of the presently described embodiments, an integrated power supply and control system, for use in a narrowband food processing or cooking system having arrays of narrowband semiconductor irradiation devices to supply narrowband infrared energy to a comestible item, comprises an energy storage section configured to store and discharge energy as direct current (DC) suitable for operating the narrowband semiconductor irradiation arrays, a memory section configured to store instructions on at least one pulse width modulation pattern representing cooking or irradiation sequences, and a control processor configured to execute the instructions from the memory section and control a supply of energy from at least one of the energy storage section and an external power source to the arrays based on the at least one pulse width modulation pattern to implement the cooking or irradiation sequences and configured to control power supplied to a monitored cooling system for the narrowband semiconductor irradiation arrays. In another aspect of the presently described embodiments, a majority of the energy is supplied by the energy storage section.

In another aspect of the presently described embodiments, a majority of energy is supplied by the external power source.

In another aspect of the presently described embodiments, the energy storage section supplies power to the cooling system.

In another aspect of the presently described embodiments, the energy section stores and discharges more power than could be drawn from a standard wall outlet.

In another aspect of the presently described embodiments, power available from the energy storage section is at least twice that of a standard wall outlet.

In another aspect of the presently described embodiments, the energy storage section is at least one of a chemical battery, fuel cell or a high discharge capacitor.

In another aspect of the presently described embodiments, the energy discharged from the energy storage section is provided in a regulated, constant current mode.

In another aspect of the presently described embodiments, the control processor is capable of using at least a predetermined cooking recipe to supply programmed power output to the arrays to control a heating process.

In another aspect of the presently described embodiments, energy stored in the energy storage section is charged, recharged or replenished by solar panels connected to the system.

In another aspect of the presently described embodiments, the control processor is connected to the internet to facilitate changing, updating or modifying the charging and discharging behavior of the energy storage section including timing of when the energy storage section is charged.

In another aspect of the presently described embodiments, the charging and discharging cycles can be widely spaced temporally in order to facilitate slow cooking or holding profiles.

In another aspect of the presently described embodiments, the system further comprises a charge monitoring component capable of monitoring an energy level of the energy storage section and determining, before commencing a heat recipe, if sufficient energy is available to accomplish a desired heating result and provide notification accordingly.

In another aspect of the presently described embodiments, the system further comprises a component capable of monitoring the presence/absence of external power sources and optimizing a heating recipe for the desired outcome given any additional energy resources.

In another aspect of the presently described embodiments, the system further comprises multiple control channels to control the narrowband semiconductor irradiation arrays to get a different heating result in different portions of the comestible item.

In another aspect of the presently described embodiments, the system further comprises a component that has the capability to at least one of read, scan, interpret, or implement a heating recipe and scale or otherwise interpret the recipe based on a status or specific power configuration of the food processing or cooking system or elements of the food processing or cooking system.

In another aspect of the presently described embodiments, the system further comprises a component to retrieve updated heating recipes from an external source.

In another aspect of the presently described embodiments, the system further comprises a connection component which would allow the system to share the energy stored in the energy storage section, or share other control and/or support functions of the system, with peripheral appliances.

In another aspect of the presently described embodiments, the peripheral appliances utilize narrowband semiconductor arrays to supply targeted infrared energy to comestible items.

In another aspect of the presently described embodiments, the system further comprises a DC to DC converter.

In another aspect of the presently described embodiments, at least one of the narrowband semiconductor irradiation arrays produces at least 100 watts of photonic emission power.

In another aspect of the presently described embodiments, the system further comprises additional energy storage sections.

In another aspect of the presently described embodiments, the supply of energy to the arrays is clean and spike free.

In another aspect of the presently described embodiments, an integrated power supply and control method, for use in a narrowband food processing or cooking system having arrays of narrowband semiconductor irradiation devices, comprises storing in a memory section instructions on at least one pulse width modulation pattern representing cooking or irradiation sequences, and controlling a supply of direct current energy from at least one of an energy storage section and an external power source to the arrays based on the at least one pulse width modulation patterns and controlling power supplied to a monitored cooling system for the arrays.

In another aspect of the presently described embodiments, the method further comprises controlling the direct current energy that has been pulse width modulated using multiple control channels.

In another aspect of the presently described embodiments, a majority of the energy is supplied by the energy storage section.

In another aspect of the presently described embodiments, a majority of energy is supplied by the external power source.

In another aspect of the presently described embodiments, the controlling comprises providing energy discharged from the energy storage section in a regulated, constant current mode.

In another aspect of the presently described embodiments, the controlling comprises using at least a pre-determined cooking recipe to supply programmed power output to the arrays to control a heating process.

In another aspect of the presently described embodiments, the method further comprises changing, updating or modifying charging and discharging behavior of the energy storage section including timing of when the energy storage section is charged.

In another aspect of the presently described embodiments, the method further comprises monitoring an energy level of the energy storage section and determining, before commencing a heat recipe, if sufficient energy is available to accomplish a desired heating result and provide notification accordingly.

In another aspect of the presently described embodiments, the method further comprising monitoring the presence/absence of external power sources and optimizing a heating recipe for the desired outcome given any additional energy resources.

In another aspect of the presently described embodiments, the method further comprises controlling multiple channels to the narrowband semiconductor irradiation arrays to get a different heating result in different portions of the comestible item.

In another aspect of the presently described embodiments, the method further comprises at least one of reading, scanning, interpreting, or implementing a heating recipe, and scaling or otherwise interpreting the recipe based on a status or specific power configuration of the food processing or cooking system or elements of the food processing or cooking system.

In another aspect of the presently described embodiments, the method further comprises retrieving updated heating recipes, from an external source.

In another aspect of the presently described embodiments, the method further comprises sharing energy stored in the energy storage section, or share other control and/or support functions, with peripheral appliances.

DETAILED DESCRIPTION

Figure 1:
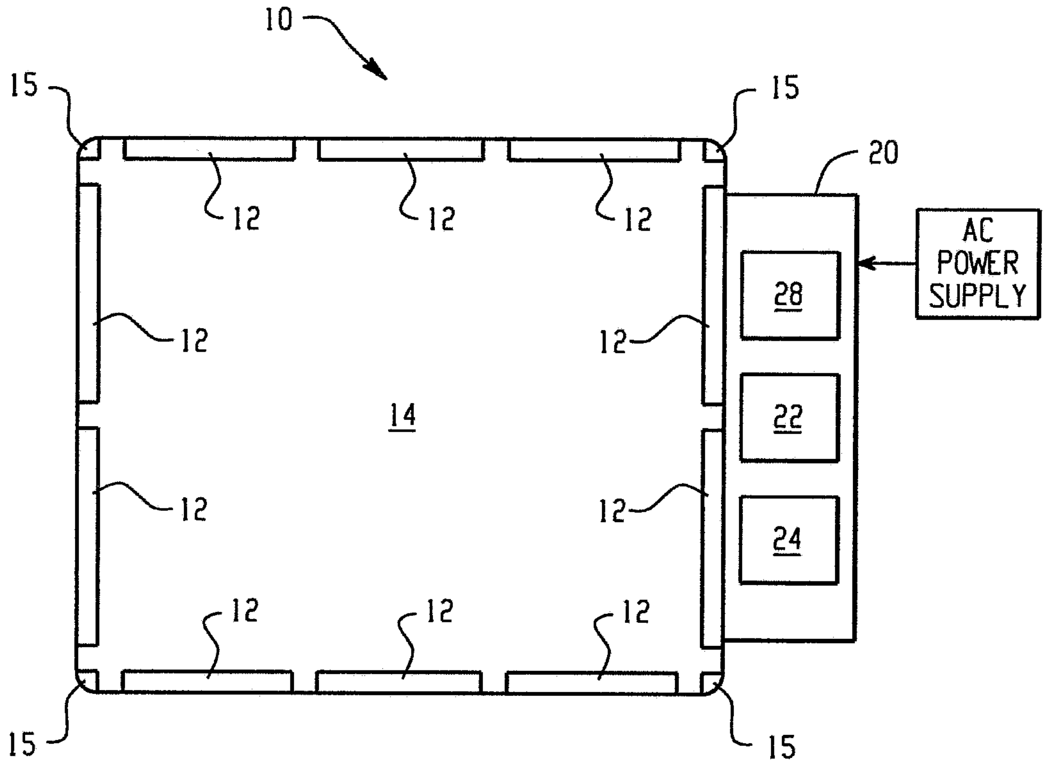
FIG. 1 is an example showing a representative view of a system according to the presently described embodiments.

A completely new class of cooking technology is currently being introduced to the consumer. It is a cooking technology which is referred to as “digital heat injection”. It uses narrowband infrared energy which is produced by arrays of semiconductor devices, e.g. narrowband semiconductor devices including, for example, laser diode devices or LED devices, in a food processing or cooking unit or oven to cook food in a high quality way but at a speed which is typically faster than the cooking times that can be attained by other cooking technology including both conventional and solid state microwave ovens. In at least one example of such a system, narrowband infrared energy that is emitted has a wavelength or narrow wavelength band that matches at least one desired absorptive characteristic of the food. In such a system, a minimum specification of, for example, 100 watts of optical or photonic emission power is contemplated for at least one of the arrays used to cook the food.

Since such narrowband cooking time is generally proportional to the amount of narrowband infrared energy that is targeted at the food, it is desirable to use large enough arrays with sufficient irradiation power to get the full advantage out of the technology. When adequate power is available to supply the arrays, the cook times for steaks, individual entrees, or frozen dinners can be as little as one to three minutes. But if the array size and power is cut in half, that time will roughly double and as it is cut in half again it will double again. While the great taste will persist regardless of the cooking time, some of the advantage of the fast cooking time will be reduced. When the cooking is facilitated by some form of solid state array, it is therefore desirable to configure the oven technology so that an adequate number of the solid state devices is included in the arrays to benefit the user with the full range of advantages the technology can supply. As an example, an 1,800-watt appliance might take 7 minutes to cook an item, while the same item might be cooked in roughly 3.5 minutes with a 3,600-watt appliance. Arrays of semiconductor-based RF or microwave devices, such as those manufactured by NXP, may have the same power needs and a somewhat similar power supply controller as narrowband infrared devices. They may, in some higher powered configurations, be able to benefit from the concepts taught in this disclosure as well.

Generally speaking, the joules of energy input is directly proportional to the cooking time of the comestible. There are some comestible items, however, which because of the more sensitive nature of the tissues comprising the food item, cannot tolerate energy input beyond a certain threshold level. Generally, the higher joule output narrowband oven will cook proportionally faster as the radiant energy output is increased. This is especially true with a deep penetration wavelength and during at least some portion of the cooking cycle. The full power of the arrays may not be used during all or even part of a cooking recipe cycle, depending on many factors that can be derived as part of the development of the ideal cooking recipe for a given comestible item or combination of items.

For example, it may be desirable to have a high level of unit time energy input during the very first portion of cooking a frozen food. Subsequently, depending on exactly what the comestible is, it may be optimal to gradually slope off the unit time energy input to get the best combination of fast cook time versus optimal taste and cooking result. Because of the nature of the diode-type semiconductor devices which are generally employed to execute narrowband cooking, it is usually more desirable to pulse width modulate (PWM) the on-time in order to achieve the energy input power profile that is desired for a particular cooking application. The diodes of a narrowband array have better life, better output efficiency and will more likely avoid untimely failure if they are run at the optimal electrical voltage and current and/or to produce an appropriate joule output. If the devices are supplied with a lower voltage or lower current, while they may produce less output, the wall plug efficiency will generally be worse on an output joules per watt basis. Because less of the energy is coming out as photons at the less optimum voltage/current, the devices will produce more heat and require more cooling. Too much current can be fatal to those diode devices, so some form of current control is absolutely essential.

Therefore, an advantageous, e.g. an optimal, power supply according to the presently described embodiments, will have a controlled and constant current and voltage but will be capable of being pulsed on and off at the desirable duty cycle. In other words, to accomplish an 80% power level, the power supply and control system would be turned on for 80% of the selected irradiation time. This can take the form of being on for 4 seconds and off for 1 second, and then back on for 4 seconds and off for 1 second, and, for example, continuing to repeat until the irradiation time has been completed. Or, because the semiconductor devices can respond in microseconds or faster, it can be much faster pulses such that it is on for 0.8 seconds and off for 0.2 seconds in a repeating sequence. Similarly, if a 20% irradiation power output is desired, the exact opposite sequence whereby the devices or arrays are provided with the power for 1 millisecond and then off for 4 milliseconds. If desirable, to fully take advantage of the speed, they could be on for 1 microsecond and off for 4 microseconds, which, from a practical standpoint, is fast enough to have the effect of producing continuously at the 20% power level.

A well-conceived cooking recipe for a given comestible might likely involve several different duty cycle power levels which are introduced as a function of time. Such a cooking recipe may be provided to the system in a variety of manners. For example, the recipe may be provided via a sensor reading of a physical object, such as read from a cookpack, provided from some other source such as the internet, or input manually or otherwise. The recipe may be used as described herein. For example, to implement a recipe, it may be desirable to use an 80% duty cycle power level for the first 10 seconds of cooking something, and then increase it to 100% for the next 30 seconds, and then back off to 20% for the next 10 seconds followed by a return to 100% for another 20 seconds followed by another low-power equilibration time followed by a high-power cooking time and then a 2-minute long ramp down period whereby it starts out at 80% and then gradually ramps down by 10% every 10 seconds until it finishes the cooking sequence at a 30% level. The array of semiconductors amounts to a fully digital heat source, so the power supply switching and the battery itself is, in at least one form according to the presently described embodiments, able to handle the rapidly pulsing, high current draw load requirement. The control system is, in at least one form, capable of recalling from memory, potentially long strings of pulse width modulation patterns which may represent a cooking recipe, e.g. a truly optimum cooking recipe. Digital, narrowband cooking or solid microwave may typically dictate that the various devices are controlled individually or in small groups so that the irradiation or the RF energy is modulated accordingly. Feedback sensors can further refine the actual pulse width modulation for any, many, or all of the semiconductor devices and may further refine a cooking recipe quite substantially in a more sophisticated implementation of the technology. The control system has enough controlled output channels to facilitate the pulsing of any devices or groups of devices which need to be pulse width modulated according to their own recipe. This will facilitate zone cooking as may be required. The control system and integral current-controlled power supply are, in at least one form, capable of remembering and executing these sequences as a necessary part of a well-conceived recipe.

For improved or optimal results, the power supply, in at least one form of the presently described embodiments, should be capable of supplying clean, spike-free, sag-free, pulse-modulated electrical energy at the voltage and current for which the narrowband array configuration has been designed, and consistent with the exact type of diode or semiconductor devices which are being employed. Conventional power supplies which are capable of high electrical current and capable of clean, pulse modulation, tend to be rather large and expensive. They also have a high input power requirement which could easily be two, three, four or more times the amount of power that is available from a 120-volt 15 or 20 amp household plug circuit. This becomes a limitation to the implementation of narrowband cooking with a countertop unit or where higher powered input AC circuits are not easily, economically, or readily available. It may be desirable to implement this technology for much higher-powered appliances also because the battery portion of the system may prove to be more economical than the large AC to DC power supplies which would otherwise be required.

According to the presently described embodiments, an example solution to these challenges comprises a high-current energy storage system which has integral current control and pulse modulation capability for driving the narrowband semiconductor arrays with the properly limited and controlled direct current power. This system could be a capacitor-based, battery-based, or a hybrid system, but it is crucial that it have integral electrical current control and the ability to cleanly do pulse modulation according to the instructions of the control system and the specifications articulated above. The output voltage and current limitation, in at least one form, must be exactly matched to the semiconductor or diode array's input requirements in order to guard the life of the devices and yet irradiate properly.

Ultimately, the power that is supplied to the arrays must be Direct Current (DC) or converted to DC in order to supply the arrays with the correct, current-controlled electrical energy to ultimately result in production of, for example, 100+ watts of optical or photonic power output on at least one of the arrays. Historically, many heat producing arrays such as bulbs, could use either interchangeably or could be designed to function properly on un-controlled AC or DC power input but narrowband radiant or semiconductor arrays inherently require DC power that is current-controlled. This is a distinguishing part of the present concept. The arrays of narrowband devices will typically be engineered with strings of diodes in electrical series to raise the input electrical voltage driving the array. This may mean designing for relatively high voltage so the input current of the array is more reasonable. If it is not designed this way, the input voltage could be very low, but the input current for the array may be way beyond practical electrical current delivery. It may be desirable to have the input voltage be in the neighborhood of 100 volts DC so that the current and wire diameters stay in a reasonable range but are completely at the discretion of the electrical designer to optimize this aspect systemically for his situation. Whatever the designer specifies, the battery array must configure enough series capacity to provide the correct higher voltage with adequate current capacity.

The storage system or battery would also be integrated such that the control would monitor the temperature of the diodes/array and would then power a cooling system which would keep the array assembly at the safe and efficient operating temperature.

According to the presently described embodiments, an exemplary solution to the challenge of having a high-powered narrowband digital cooking array system which can operate with standard 15 amp 120 volt electrical circuits is described as follows. With reference to FIG. 1, an example, representative narrowband oven, or food processing or cooking, system 10 which has large irradiation arrays 12 to irradiate an oven cavity 14 will be driven by a special power supply control system 20. In at least one form, the arrays are arrays of narrowband semiconductor irradiation devices to supply narrowband infrared energy to a food or comestible item. Also shown are feedback sensors 15, which are optional and could take a variety of different forms.

Through, for example, use of a processor or controller 22, the power supply and control system 20 has the ability to pulse width modulate appropriately large amounts of current-limited energy, repeating a taught, stored or retrieved string of pulse width modulation patterns representing cooking or irradiation sequences stored in a configured memory section 24 within the power supply and control system 20. In this regard, the processor or controller (or control processor) is configured to execute instructions from the memory section and control a supply of energy from at least one of the energy storage section and an external power source to the array based on at least one pulse width pattern to implement the cooking or irradiation sequences and configured to control power supplied to a monitored cooling system for the narrowband semiconductor irradiation arrays. In this way, the control processor will be able to use at least a pre-determined cooking recipe to supply programmed power output to the arrays to control a heating process. In at least one form, energy is provided in a regulated, constant current mode.

The power supply and control system is capable of controlling the exact electrical current level of all the electrical pulses so they are at the specified voltage and current for the digital narrowband arrays which are being driven. Integral with the power supply control will be an electrical or energy storage system 28 comprising, for example, a high-current capacity battery, a high-current capacity capacitor, a fuel cell, or a hybrid system, instead of the traditional AC to DC converting power supply. The energy storage section 28 of the system 20 is capable of storing enough electrical energy to supply the power needs for a particular cooking session in the system 10. In at least one form, the energy storage or section or medium is configured to store and discharge energy as direct current (DC) suitable for operating the narrowband semiconductor irradiation arrays. In at least one form, the instantaneous wattage capacity will be several times (e.g. more than twice) that which could be drawn from a standard wall outlet, such as a typical 120 volt 15 amp electrical circuit in order to facilitate the high-powered narrowband or solid state microwave cooking.

In at least one form of the presently described embodiments, a majority of energy supplied by the system is supplied by the energy storage section. Alternatively, the majority of energy may be supplied by the external power source. Further, the energy storage section may also supply power to the cooling system for the arrays. In at least one form, the energy storage section could provide all energy for the system. This allows for operation in many environments including in the absence of an external power source and/or where portability is desired.

The power supply and control system 20 has enough intelligence to calculate and report as to whether enough stored electrical energy is still available to complete the next specified cooking recipe. The control system 20 monitors the coulombs of electricity that have passed through the power supply in both the charging and the discharging modes so that it knows the amount of remaining power in the energy storage section, e.g. a battery (e.g. chemical battery), fuel cell, or capacitor (e.g. high discharge capacitor), at all times. The system 20 has the ability to be programmed for a wide variety of functions and features which include monitoring battery health and/or smart charging so that the battery can be charged according to the owners' dictates and preferences including the ability to charge during the most inexpensive off-peak electrical utility hours. The control system 20 also has the ability to network with other electrical appliances and personal electronics in order to use the power stored in the battery as may be needed for emergency situations and to recharge other devices. The control system 20 is capable of monitoring and controlling high-powered recharging systems or could monitor the recharging by way of very low-powered charging systems or by solar-powered charging systems. The system 20 also has the ability to accommodate additional energy storage devices being added to augment its basic power. This could be used, for example, for an appliance which has a fundamental capacity to cook four average meals with the built-in power storage. By adding an additional add-on augmentation storage pack (e.g. by using a quick connect), it could increase that capacity to perhaps six meals. And it could have the ability to augment with a second, third, or more augmentation storage packs to allow for even more cooking time duration. Such a system could have the capability of actually providing back-up power for other appliances or electrical devices in the event of a power outage or emergency situation. Also, the battery or energy storage section could be monitored to determine, for example, a time for full charge, remaining use or cook time, cooking capacity, recharge time needed, recharge scheduling or cooking initiation capacity or time.

Such a power supply and control system 20 could be advantageously integrated with the Internet of Things (IoT) to keep its owner thoroughly apprised of many things including cooking progress and remaining time, various information about recharging times and recharging for a specific purpose, current availability of solar power, and other information. The system could include a component or be configured to monitor the presence/absence of external power sources and optimize a heating recipe for a desired outcome given any additional energy resources. It could have grid awareness to intelligently delay charging until off-peak times for best conservation and lowest cost. For example, the control processor could be connected to the internet to facilitate changing, updating or modifying the charging and discharging behavior of the energy storage section including timing of when the energy storage section is charged to take advantage of, for example, desirable electricity costs. The power supply controller would also be expected to run and monitor a cooling system for the narrowband arrays. The power supply control system is also capable of performing and controlling long-cycle cooking (e.g. using temporally widely spaced charging and discharging cycles) either for the purpose of doing very slow cooking or for holding something at temperature over an extended period of time. It would still pulse width modulate the energy delivery but would space them out and deliver them with a very low-duty cycle over long periods of time. The system could be smart enough to charge between pulse width modulation discharges, if desirable.

The control processor is, in at least one form, configured to control the narrowband semiconductor irradiation arrays on multiple channels to obtain a different heating result in different portions of the comestible or food item. Arrays or portions of arrays may be responsive to different channels of control to achieve this feature.

Also, the system, in at least one form, is configured or includes a component to at least one of read, scan, interpret or implement a heating recipe and scale or otherwise interpret the recipe based on a status or specific power configuration of the food processing or cooking system or element of the food processing or cooking system. Specifications of the system that could be monitored could include a variety of elements including, for example, battery status, number and power of arrays, energy resources (including resources beyond the energy storage section or medium), and number of control channels.

In addition, the power supply and control system 20 will, in at least one form, be capable of connection to outside sources through, for example, an internet connection to update its operation parameters. For example, the system may connect to the internet (or other appropriate network) to retrieve update information on a particular cooking recipe. Such an update may be available from an appropriate source in the event of, for example, the availability of a new cooking program for a comestible or food item, or a new cook pack or container for the comestible or food item. Further, such an update will potentially trigger the system to alter its operation to accommodate the update.

Figure 2:
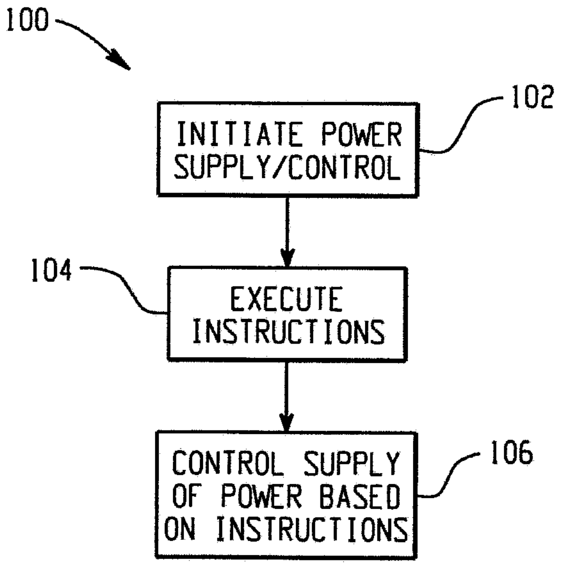
FIG. 2 is an example flowchart showing a method according to the presently described embodiments; and, FIG. 3 is an example showing a block diagram of a system according to the presently described embodiments.

In operation, with reference now to FIG. 2, an example method 100 according to the presently described embodiments is described. First, supply and/or control of power is initiated (at 102). Then, the controller or processor 22 reads, retrieves, interprets, implements or executes the instructions stored or maintained in the memory section 24. As noted above, these instructions, while potentially taking a variety of forms, will generally include pulse width modulation patterns representing cooking or irradiation sequences for the arrays of, for example, the oven system 10. Next, the power supplied through the system 20, including energy from at least one of the energy storage section 28 and/or any external power source (e.g. from a wall outlet), to the arrays is controlled according to the instructions retrieved from the memory section. Power, in at least one form, is also supplied and/or controlled for any cooling system for the arrays (e.g. a monitored coding system).

Of course, this method 100 is merely an example. Other methods that implement the functionality of the elements of the presently described embodiments may also be implemented. For example, the method may include controlling the direct current energy that has been pulse width modulated using multiple control channels. The method may result in a majority of energy being supplied by the energy storage section, or a majority of energy being supplied by the external power source. The controlling may comprise providing energy discharged from the energy storage section in a regulated, constant current mode. The controlling may comprise using at least a pre-determined cooking recipe to supply programmed power output to the arrays to control a heating process. The method may comprise changing, updating or modifying charging and discharging behavior of the energy storage section including timing of when the energy storage section is charged. The method may comprise monitoring an energy level of the energy storage section and determining, before commencing a heat recipe, if sufficient energy is available to accomplish a desired heating result and provide notification accordingly. The method may comprise monitoring the presence/absence of external power sources and optimizing a heating recipe for the desired outcome given any additional energy resources. The method may comprise controlling multiple channels to the narrowband semiconductor irradiation arrays to get a different heating result in different portions of the comestible item. The method may comprise at least one of reading, scanning, interpreting, or implementing a heating recipe, and scaling or otherwise interpreting the recipe based on a status or specific power configuration of the food processing or cooking system or elements of the food processing or cooking system. The method may comprise retrieving updated heating recipes, from an external source. The method may comprise sharing energy stored in the energy storage section, or share other control and/or support functions of the system, with peripheral appliances.

Figure 3:
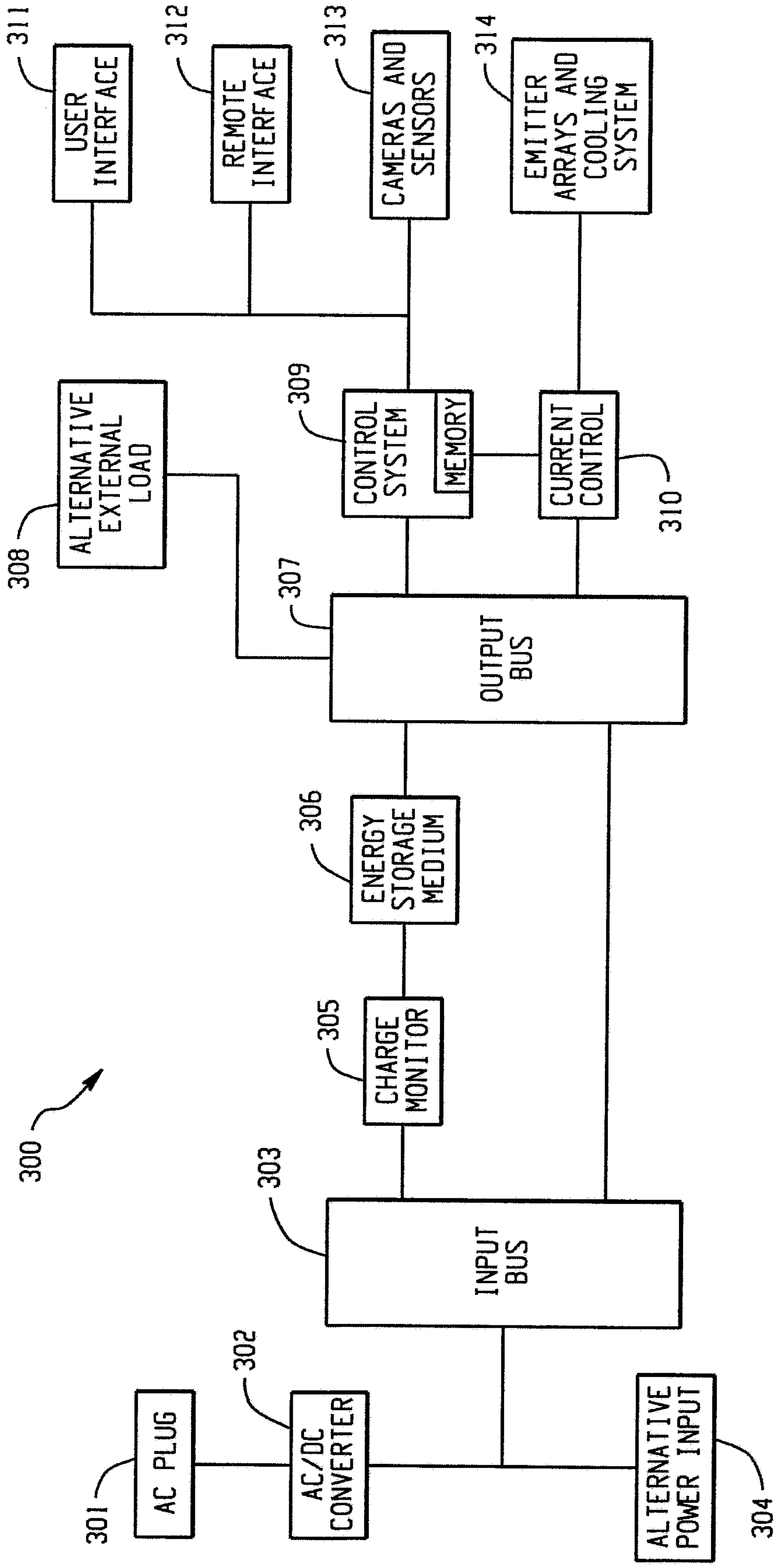

With reference now to FIG. 3, another exemplary embodiment of the systems described herein including the system of FIG. 1 is shown. It should be appreciated that the features described above (including the features of the system of FIG. 1 and the methods described in connection with FIG. 2) may be implemented in the system of FIG. 3 as will be appreciated by those of skill in the art. In FIG. 3, a system 300 is illustrated. The system 300, in at least one form, is a food processing or cooking system using a power supply and control system according to the presently described embodiments and utilizes a power source (e.g. an external power source)—into which an AC plug 301 may be connected—which may take the form of, for example, an alternating current (AC) wall outlet or receptacle. The AC plug 301 is connected to AC/DC converter 302 which is connected to an input bus 303. An alternate power input 304 is also optionally connected to the input bus 303. The alternate power input 304 may accommodate a variety of alternative power sources such as a solar power source, a generator, fuel cell . . . etc. The alternate power source 304 may provide supplemental power to the system or provide power or charging to elements of the system such as the energy storage medium or section 306 (described below). For example, the energy storage section may be charged, recharged or replenished by solar panels connected to the system. Also, a DC to DC converter may also be provided to the system to ensure that all elements of the system receive correct voltage for appropriate or optimal operation.

The input bus 303 connects to an output bus 307 on, for example, two different paths. A first path establishes a direct connection between the input bus 303 and the output bus 307. A second path includes a charge monitor 305 and an energy storage medium 306.

The charge monitor 305 may take a variety of forms to monitor the charge and discharge capability of the energy storage medium or section 306. Likewise, the energy storage medium 306 may take a variety of forms including the aforementioned forms that include a capacitor-based system, a battery-based system, a chemical system, a fuel cell, or a hybrid system. In addition, it should be appreciated that the energy storage medium may be charged using the external power sources shown (e.g. AC plug 301 or alternate power input 307) or other power sources (not shown).

An alternative external load 308 may also be connected to the output bus 307. The alternative external load could take a variety of forms and provide a variety of different capabilities to the system 300. For example, the alternative external load 308 could represent a charging port for external devices and appliances. Such external or peripheral devices or appliances could share energy (including energy from the energy storage section) and/or share all other control and/or support functions or features provided in the system, and such devices may also utilize narrowband semiconductor irradiation arrays to supply targeted infrared energy to comestible items. As but one example, such a device may comprise a toaster.

A control system 309 and a current control element 310 are also connected to the output bus 307. The control system 309 may take a variety of forms to achieve the capabilities described herein including the features and capabilities of the system including the processor or controller 22 of FIG. 1. In at least one form, the control system 309 comprises a processor or a control processor that communicates with the user interface 311, a remote interface 312, and a variety of cameras and sensors 313 to achieve overall functionality of, for example, the system 300.

The control system 309 will, in at least one form, include a memory section having stored therein pulse width modulation patterns representing cooking or irradiation sequences to be used in the system to implement recipes or other programmed functions. As shown, the memory section is integrated with the control system 309; however, the memory section could also be a separate element as shown, for example, by element 24 of FIG. 1.

The control system 309 is also in communication with the current control element 310 to control the direct current (DC) energy provided to the emitter arrays using the contemplated pulse width modulation techniques based on the noted patterns.

It will be appreciated that the presently described embodiments are described in terms of example hardware configurations and/or software routines. However, a variety of different hardware configurations and/or software routines may be used to implement the presently described embodiments.

Also, the above-described power supply control system could dramatically increase the performance of a narrowband- or semiconductor-based cooking system and make more convenient, more portable, and available to a much wider swath of potential owners. The above describes some of the capabilities of the special type of power supply control system solution of this description, but other features, capabilities, and benefits will be apparent as one skilled in the art begins to implement such technology.

Generally, exemplary embodiments have been described. Modifications and alterations may occur to others upon reading and understanding the preceding detailed description. It is intended that the exemplary embodiments be construed as including all such modifications and alterations insofar as they come within the scope of the protection afforded the present application by, for example, allowed claims or the equivalents thereof.

The invention claimed is:

1. An integrated power supply and control system for use in a narrowband food processing or cooking system having arrays of narrowband semiconductor irradiation devices to supply narrowband infrared energy to a comestible item, the integrated power supply and control system comprising:

an energy storage section configured to store and discharge energy as direct current (DC) suitable for operating the narrowband semiconductor irradiation arrays;

a memory section configured to store instructions on at least one pulse width modulation pattern representing cooking sequences; and a control system, including a processor, configured to execute the instructions from the memory section and control a supply of energy from the energy storage section and an external power source to the narrowband semiconductor arrays by limiting the direct current (DC) based on direct current (DC) input requirements of the narrowband semiconductor arrays and the at least one pulse width modulation pattern to implement the cooking sequences such that the narrowband infrared energy of the narrowband semiconductor arrays is modulated according to the cooking sequences and configured to monitor temperature of the narrowband semiconductor arrays and control power supplied to a cooling system for the narrowband semiconductor irradiation arrays to maintain a selected operating temperature of the narrowband semiconductor arrays;

wherein the energy storage section is configured to store and discharge more power than supplied by the external power source, wherein the external power source comprises a standard wall outlet and wherein power available from the energy storage section is at least twice that of the standard wall outlet such that the direct current is provided to the narrowband semiconductor arrays according to the cooking sequence and is controlled by the control system such that electrical current levels of all electrical pulses of the cooking sequence meet the input requirements of the narrowband semiconductor arrays.

2. The system as set forth in claim 1 wherein a majority of the energy is supplied by the energy storage section.

3. The system as set forth in claim 1 wherein a majority of energy is supplied by the external power source.

4. The system as set forth in claim 1 wherein the energy storage section supplies power to the cooling system.

5. The system as set forth in claim 1, wherein the narrowband semiconductor arrays emit energy having a bandwidth less than 15 nanometers.

6. The system as set forth in claim 1, wherein the energy storage section is integrated in the system such that the control system controls the energy storage section, monitors the temperature of the narrowband semiconductor arrays, and controls the power to the cooling system to maintain the selected operating temperature to be safe and efficient.

7. The system set forth in claim 1 wherein the energy storage section is at least one of a chemical battery, fuel cell or a high discharge capacitor.

8. The system set forth in claim 1 wherein the energy discharged from the energy storage section is provided in a regulated, constant current mode.

9. The system as set forth in claim 1 wherein the control processor is capable of using at least a pre-determined cooking recipe to supply programmed power output to the arrays to control a heating process.

10. The system as set forth in claim 1 wherein energy stored in the energy storage section is charged, recharged or replenished by solar panels connected to the system.

11. The system as set forth in claim 1 wherein the control processor is connected to the internet to facilitate changing, updating or modifying the charging and discharging behavior of the energy storage section including timing of when the energy storage section is charged.

12. The system as set forth in claim 1 wherein charging and discharging cycles can be widely spaced temporally in order to facilitate slow cooking or holding profiles.

13. The system as set forth in claim 1 further comprising a charge monitoring component capable of monitoring an energy level of the energy storage section and determining, before commencing a heat recipe, if sufficient energy is available to accomplish a desired heating result and provide notification accordingly.

14. The system as set forth in claim 1 further comprising a component capable of monitoring the presence/absence of external power sources.

15. The system as set forth in claim 1 further comprising multiple control channels to control the narrowband semiconductor irradiation arrays to get a different heating result in different portions of the comestible item.

16. The system as set forth in claim 1 further comprising a component that has the capability to at least one of read, scan, interpret, or implement a heating recipe and scale or otherwise interpret the recipe based on a status or specific power configuration of the food processing or cooking system or elements of the food processing or cooking system.

17. The system as set forth in claim 1 further comprising a component to retrieve updated heating recipes from an external source.

18. The system set forth in claim 1 further comprising a connection component which would allow the system to share the energy stored in the energy storage section, or share other control and/or support functions of the system, with peripheral appliances.

19. The system set forth in claim 18 wherein the peripheral appliances utilize narrowband semiconductor arrays to supply targeted infrared energy to comestible items.

20. The system as set forth in claim 1 further comprising an AC to DC converter.

21. The system as set forth in claim 1 wherein at least one of the narrowband semiconductor irradiation arrays produces at least 100 watts of photonic emission power.

22. The system as set forth in claim 1 further comprising additional energy storage sections.

23. The system as set forth in claim 1 wherein the supply of energy to the arrays is clean and spike free.

24. The system as set forth in claim 1, wherein the narrowband semiconductor arrays emit energy having a bandwidth less than 150 nanometers.

25. An integrated power supply and control method for use in a narrowband food processing or cooking system having arrays of narrowband semiconductor irradiation devices to supply narrowband infrared energy to a comestible item, the integrated power supply and control method comprising:

storing in a memory section instructions on at least one pulse width modulation pattern representing cooking sequences;

controlling a supply of direct current energy from an energy storage section and an external power source to the narrowband semiconductor arrays by limiting the direct current (DC) based on direct current input requirements of the narrowband semiconductor arrays and on the at least one pulse width modulation patterns to implement the cooking sequences such that the narrowband infrared energy of the narrowband semiconductor arrays is modulated according to the cooking sequence, the direct current being provided to the narrowband semiconductor arrays according to the cooking sequence and being controlled such that electrical current levels of all electrical pulses of the cooking sequence meet the input requirements of the narrowband semiconductor arrays, wherein the external power source comprises a standard wall outlet and wherein power available from the energy storage section is at least twice that of the standard wall outlet; and, controlling power supplied to a cooling system for the arrays to maintain a selected operating temperature of the narrowband semiconductor arrays based on a monitored temperature.

26. The method as set forth in claim 25 wherein a majority of the energy is supplied by the energy storage section.

27. The method as set forth in claim 25 wherein a majority of energy is supplied by the external power source.

28. The method set forth in claim 25 wherein the controlling comprises providing energy discharged from the energy storage section in a regulated, constant current mode.

29. The method as set forth in claim 25 wherein the controlling comprises using at least a pre-determined cooking recipe to supply programmed power output to the arrays to control a heating process.

30. The method as set forth in claim 25 further comprising changing, updating or modifying charging and discharging behavior of the energy storage section including timing of when the energy storage section is charged.

31. The method as set forth in claim 25 further comprising monitoring an energy level of the energy storage section and determining, before commencing a heat recipe, if sufficient energy is available to accomplish a desired heating result and provide notification accordingly.

32. The method as set forth in claim 25 further comprising monitoring the presence/absence of external power sources.

33. The method as set forth in claim 25 further comprising controlling multiple channels to the narrowband semiconductor irradiation arrays to get a different heating result in different portions of the comestible item.

34. The method as set forth in claim 25 further comprising at least one of reading, scanning, interpreting, or implementing a heating recipe, and scaling or otherwise interpreting the recipe based on a status or specific power configuration of the food processing or cooking system or elements of the food processing or cooking system.

35. The method as set forth in claim 25 further comprising retrieving updated heating recipes, from an external source.

36. The method set forth in claim 25 further comprising sharing energy stored in the energy storage section, or share other control and/or support functions, with peripheral appliances.

37. The method as set forth in claim 25 further comprising controlling the direct current energy that has been pulse width modulated using multiple control channels.

38. The method as set forth in claim 25, wherein the narrowband semiconductor arrays emit energy having a bandwidth less than 150 nanometers.

39. The system as set forth in claim 25, wherein the narrowband semiconductor arrays emit energy having a bandwidth less than 15 nanometers.

40. An integrated power supply and control system for use in a narrowband food processing or cooking system having arrays of narrowband semiconductor irradiation devices to supply narrowband infrared energy to a comestible item, the integrated power supply and control system comprising:

an energy storage section configured to store and discharge energy as direct current (DC) suitable for operating the narrowband semiconductor irradiation arrays;

a memory section configured to store instructions on at least one pulse width modulation pattern representing cooking sequences; and a control system, including a processor, configured to execute the instructions from the memory section and control a supply of energy from the energy storage section to the narrowband semiconductor arrays by limiting the direct current (DC) based on direct current input requirements of the narrowband semiconductor arrays and the at least one pulse width modulation pattern to implement the cooking sequences such that the narrowband infrared energy of the narrowband semiconductor arrays is modulated according to the cooking sequences and configured to monitor temperature of the narrowband semiconductor arrays and control power supplied to a cooling system for the narrowband semiconductor irradiation arrays to maintain a selected operating temperature of the narrowband semiconductor arrays;

wherein the energy storage section stores and discharges more power than supplied by a standard wall outlet, wherein power available from the energy storage section is at least twice that of the standard wall outlet such that the direct current is provided to the narrowband semiconductor arrays to produce at least 100 watts of optical power output according to the cooking sequence and is controlled by the control system such that electrical current levels of all electrical pulses of the cooking sequence meet the input requirements of the narrowband semiconductor arrays.

41. The system as set forth in claim 40, wherein the narrowband semiconductor arrays emit energy having a bandwidth less than 150 nanometers.

42. The system as set forth in claim 40, wherein the narrowband semiconductor arrays emit energy having a bandwidth less than 15 nanometers.

* * * * *